United States Patent [19]
Ryan et al.

[11] Patent Number: 6,003,066
[45] Date of Patent: Dec. 14, 1999

[54] SYSTEM FOR DISTRIBUTING A PLURALITY OF THREADS ASSOCIATED WITH A PROCESS INITIATING BY ONE DATA PROCESSING STATION AMONG DATA PROCESSING STATIONS

[75] Inventors: Jeffrey M. Ryan, Byron; Curtis H. Brobst; Chih-Hsiang Chou, both of Rochester, all of Minn.

[73] Assignee: International Business Machines Corporation, Armonk, N.Y.

[21] Appl. No.: 08/911,417

[22] Filed: Aug. 14, 1997

[51] Int. Cl.$^6$ ..................................................... G06F 13/00
[52] U.S. Cl. ............................................................. 709/201
[58] Field of Search ..................................... 709/200, 201, 709/203, 205, 208, 217, 218, 219, 221, 222, 223, 224

[56] References Cited

U.S. PATENT DOCUMENTS

| | | | |
|---|---|---|---|
| 5,421,014 | 5/1995 | Bucher | 709/100 |
| 5,692,192 | 11/1997 | Sudo | 709/105 |
| 5,729,710 | 3/1998 | Magee et al. | 709/104 |
| 5,745,703 | 4/1998 | Cejtin et al. | 709/238 |
| 5,812,811 | 9/1998 | Dubey et al. | 709/106 |
| 5,828,880 | 10/1998 | Hanko | 709/106 |

*Primary Examiner*—Moustafa M. Meky
*Attorney, Agent, or Firm*—Jack V. Musgrove; Andrew J. Dillon

[57] ABSTRACT

A computer network provides distribution of a multithread process among different data processing stations in the network. In one embodiment, a global name server is used to distribute the threads and update values associated with the threads. When the process is created, the global name server establishes a distributed process context by dividing logical addresses used by the process among physical addresses corresponding to respective portions of the system memory devices (RAM) in different data processing stations. The global name server assigns a universally unique identification number (UUID) to each process, and uses the UUID to manage the distributed threads. When the data in the distributed process context is updated, the changes are apparent to all threads executing in the distributed process. This approach simplifies access and retrieval of shared process context information, and may be implemented using current thread models, making it easier to incorporate into existing networks.

17 Claims, 4 Drawing Sheets

SYSTEM FOR DISTRIBUTING A PLURALITY OF THREADS ASSOCIATED WITH A PROCESS INITIATING BY ONE DATA PROCESSING STATION AMONG DATA PROCESSING STATIONS

BACKGROUND OF THE INVENTION

1. Field of the Invention

The present invention generally relates to computer systems, and more particularly to a method of distributing a multithread process among multiple workstations of a computer network, for improved high performance multithread data processing.

2. Description of the Related Art

The basic structure of a conventional computer system includes one or more processors which are connected to several input/output (I/O) devices for the user interface (such as a display monitor, keyboard and mouse), a permanent memory device for storing the computer's operating system and user programs (such as a magnetic hard disk), and a temporary memory device that is used by the processors to carry out program instructions (such as random access memory or RAM). The processors communicate with the other devices by various means, including a system bus or a direct channel.

When a user program runs on a computer, the computer's operating system (OS) first loads the main program file into system memory. The program file includes several objects (values) stored as data or text, and instructions for handling the data and other parameters which may be input during program execution. The processors use "logical addresses" to access the file objects, and these logical addresses correspond to physical addresses in RAM. Binding of instructions and data to physical memory addresses is accomplished by compiling the program file using relocatable code, which is indexed (linked) to physical memory by the OS loader during loading of the file.

A computer program can be broken down into a collection of processes which are executed by the processor(s). A process is a set of resources, including (but not limited to) logical addresses, process limits, permissions and registers, and at least one execution stream. The smallest unit of operation to be performed within a process is referred to as a thread. The use of threads in modern operating systems is well known. Threads allow multiple execution paths within a single address space (the process context) to run concurrently on a processor. This "multithreading" increases throughput in a multiprocessor system and provides modularity in a uniprocessor system.

In a single tasking operating system, a computer processor executes computer programs or program subroutines serially, that is no computer program or program subroutine can begin to execute until the previous computer program or program subroutine has terminated. This type of operating system does not make optimum use of the computer processor in a case where an executing computer program or subroutine must await the occurrence of an external event (such as the availability of data or a resource) because processor time is wasted. This problem lead to multitasking operating systems wherein each of the program threads performs a specific task. If a thread being executed must wait for the occurrence of an external event, i.e., the thread becomes "non-dispatchable," then its execution is suspended and the computer processor executes another thread of the same or different computer program to optimize utilization of processor assets. Multitasking operating systems have also been extended to multiprocessor environments where threads of the same or different programs can execute in parallel on different computer processors.

FIG.1 illustrates multithreading in a prior art multiprocessor computer system 10. System unit 10 includes one or more processors 12a, 12b and 12c which are connected to various I/O devices 14 and a memory device 16 (RAM) via a bus 18. Each processor includes a central processing unit (CPU) and one or more on-board caches. Each cache comprises a small amount of high speed memory which stores a local copy of data utilized by its associated processor. A typical processor used for multithread processing is the PowerPC™ integrated circuit superscalar microprocessor manufactured by International Business Machines Corporation. When data requested by a processor is not resident within its associated cache, the processor will attempt to load the requested data from an optional (L2) cache, or from global memory 16 (which may include one or more individual modules of physical memory).

Global memory 16 has a kernel portion with a set 20 of thread context fields for N number of threads associated with a particular process. Global memory 16 further includes a process context 22 in a user address space which contains all of the logical addresses for data and instructions used by the process. After a thread is created and prior to termination, the thread will most likely utilize system resources to gain access to process context 22. Through the process context, process threads can share data and communicate with one another in a simple and straightforward manner.

Separate computers can be linked into vast networks which allow for the distribution of processing among various systems in the networks. Unfortunately conventional systems only support distributing entire processes across the network, and do not support distribution of threads, since there is no common process context for the various systems in the network. This limitation causes programmers to use contorted mechanisms when writing distributed programs that need to work together to accomplish a task. These mechanisms often involve complicated communication protocols (such as sockets or pipes) that are very time consuming to develop and difficult to debug. An alternative approach is to provide a common process context using a shared virtual memory system which maps a large virtual memory space globally to all processes in the system. This approach, however, causes problems in performance, security and integrity. It would, therefore, be desirable and advantageous to provide an improved method to allow execution of various threads of a single process on different systems in the network.

SUMMARY OF THE INVENTION

It is therefore one object of the present invention to provide an improved computer network allowing for distributed processes.

It is another object of the present invention to provide such a computer network which distributes threads from a single process to different systems in the network.

It is yet another object of the present invention to provide such a computer network wherein the threads may be distributed without the use of complicated communication protocols or global virtual memory spaces.

The foregoing objects are achieved in a computer network generally comprising a communications medium, a plurality of data processing stations (each having one or more processors, a communication device connected to the communications medium, and a system memory device), and means for distributing a plurality of threads associated with a process initiated by one of the data processing stations among at least two of the data processing stations. In the disclosed embodiment, the distributing means includes a global name server for distributing the threads among the data processing stations and updating values associated with the threads. When the process is created, the global name server establishes a distributed process context associated with the threads by dividing logical addresses used by the process among physical addresses corresponding to respective portions of the system memory devices in different data processing stations. The global name server assigns a universally unique identification number (UUID) to each process, and uses the UUID to manage the distributed threads. The global name server can maintain a table or index of stations and associated UUIDs to confirm that a particular station is authorized to access a particular distributed process context. When the data in the distributed process context is updated, the changes are apparent to all threads executing in the distributed process. This approach simplifies access and retrieval of shared process context information, and may be implemented using current thread models, making it easier to incorporate into existing networks.

The above as well as additional objectives, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
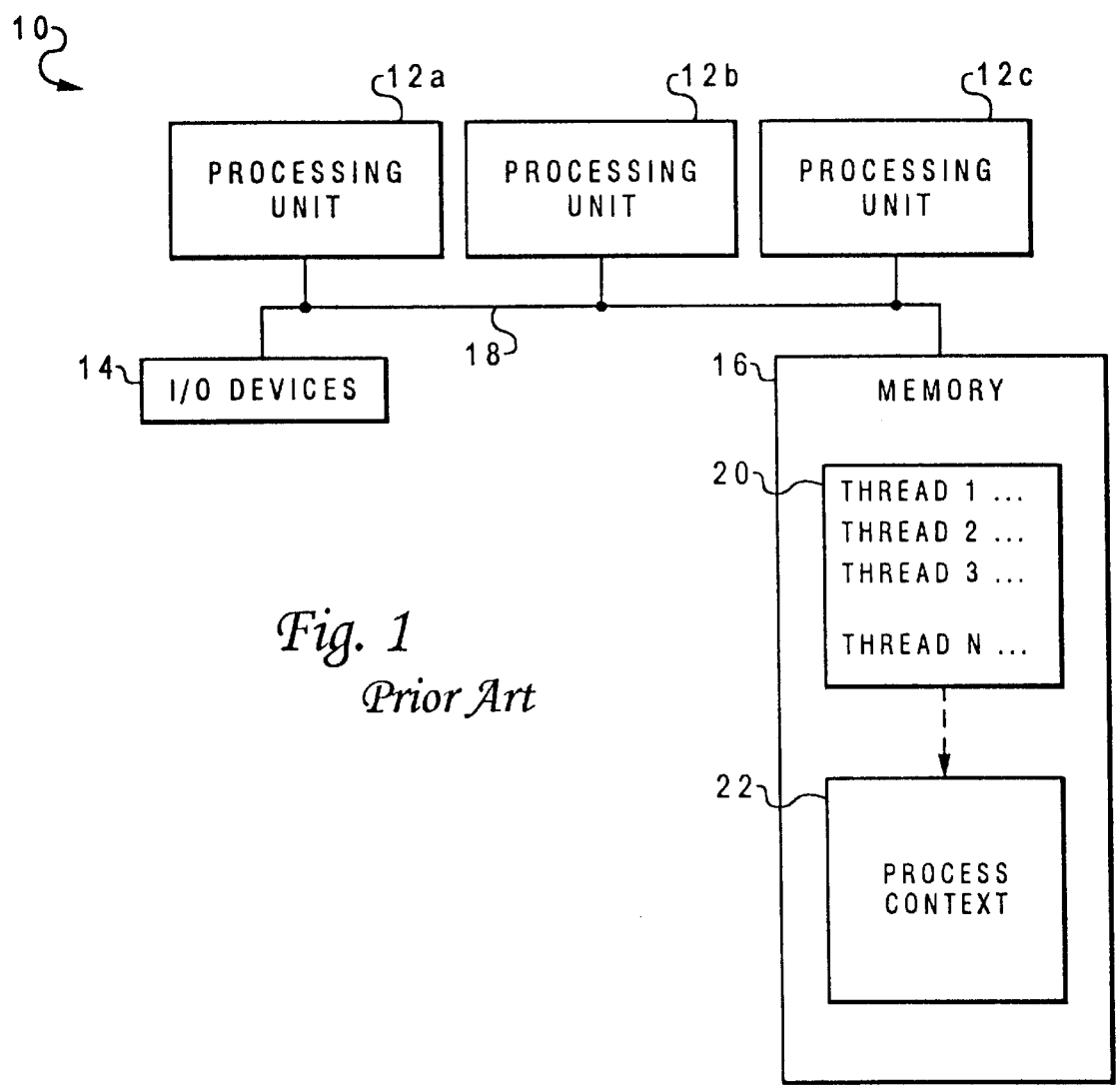
FIG. 1 is a block diagram of a conventional data processing system using multithreading.
Figure 2:
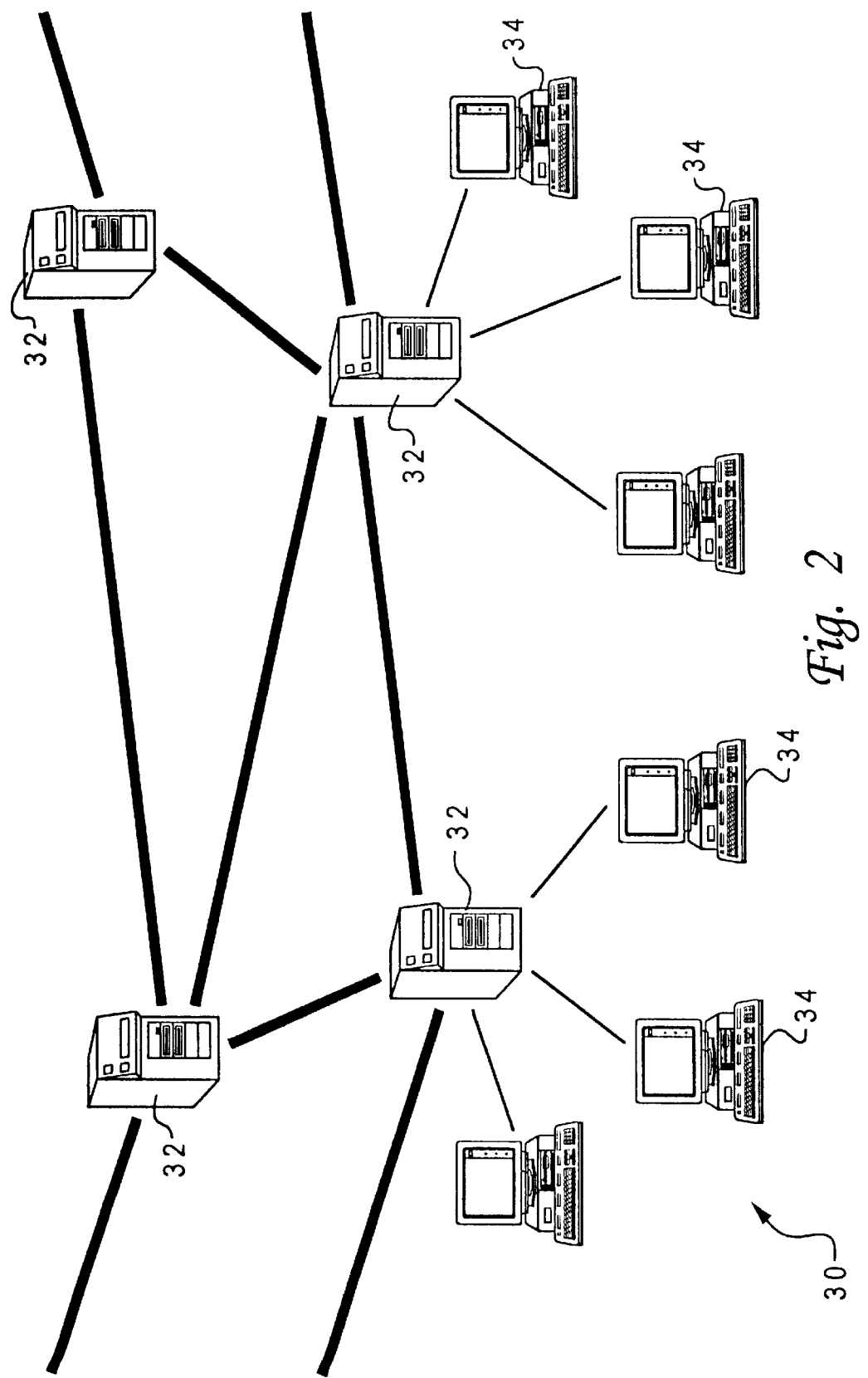
FIG. 2 is high-level representation of a computer network having a plurality of data processing stations adapted to provide for distributed processes according to the present invention.

With reference now to the figures, and in particular with reference to FIG. 2, there is depicted a generalized computer network 30 providing distributed processes according to the present invention. Network 30 may be any one of a number of different types of networks including, but not limited to, a local area network (LAN), a UNIX-type network, or the Internet. Network 30 includes a plurality of data processing stations; in the depicted embodiment, network 30 is a client-server network, and the data processing stations include several servers 32 and several clients or workstations 34.

Servers 32 are interconnected, either directly to each other or indirectly through one of the other servers. Each server is essentially a stand-alone computer system (having a processor, a memory device, and a communications device), but has been adapted (programmed) for one primary purpose, that of providing information to individual users at client workstations 34. Workstations 34 can also be stand-alone computer systems, or "dumber" systems adapted for limited use with network 30. Conventional protocols can be used to allow the servers to communicate with each other, and to allow different workstations to communicate via the servers. A conventional communications medium may be used to physically interconnect the data processing stations.

The present invention extends multithreading to allow execution of the various threads on different systems (data processing stations) in network 30, creating a distributed process. Associated with this distributed process is a distributed process context (DPC) which represents a shared address space for that process, as discussed further below. The distributed process has one or more distributed threads executing on two or more systems. Each distributed thread in the distributed process has access to the distributed process context and can use it to share data and otherwise communicate with other threads in the same distributed process.

When a distributed process is created, a new distributed process context is established and associated with the primary thread of the process. As new distributed threads are created, they are associated with the distributed process and are given access to the distributed process context. At that time, any information in the distributed process context can be read or updated. When the data in the distributed process context is updated, the changes are apparent to all threads executing in the distributed process.

Figure 3:
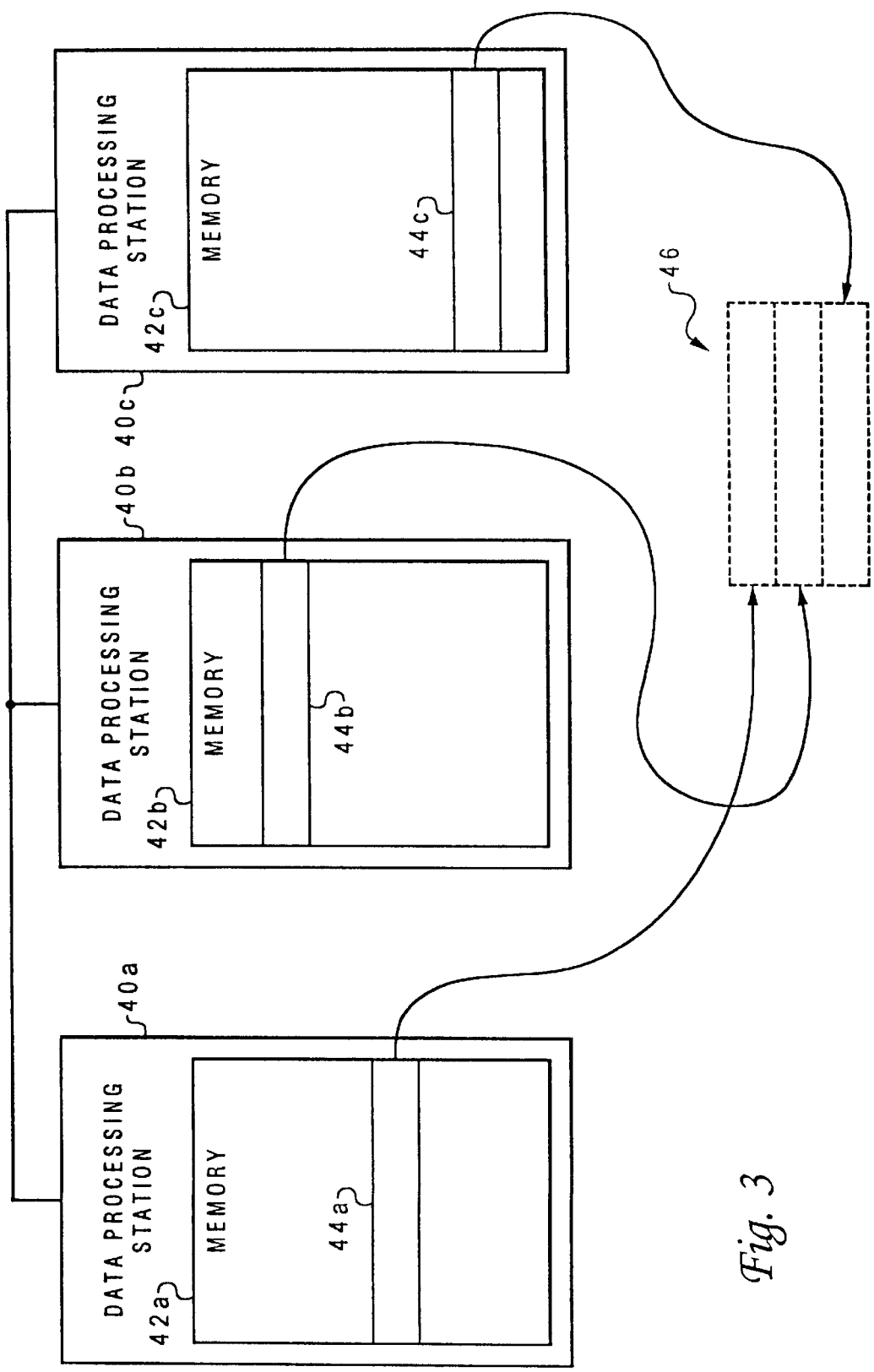
FIG. 3 is a block diagram depicting a distributed process context formed from portions of memory devices in the data processing stations.

The creation of the DPC may be further understood with reference to FIG. 3. Three data processing stations 40a, 40b and 40c, which are interconnected through the network, are used to carry out a multithread process. Each data processing station has one or more processors, a communication device for accessing the network, and system RAM (42a, 42b and 42c). A portion 44a of memory 42a from the first station 40a is dedicated to the DPC 46, a portion 44b of memory 42b from the second station 40b is dedicated to DPC 46, and a portion 44c memory 42c from the third station 40c is also dedicated to the DPC. In other words, the logical addresses used by the distributed process (i.e., used by the threads) are divided among physical addresses corresponding to memory locations in different data processing stations, to create a shared memory object. While this feature of the invention is optional (since a single station could provide the entire DPC), it is likely that many processes can be optimized by dividing up the DPC between stations which are executing the threads. These stations can be clients, servers, or both. While only three data processing stations are shown in FIG. 3, there could be many more. Also, since multiple processes can be split among different machines, a given station's memory may have several different portions which have been allocated for different DPCs.

This approach simplifies access and retrieval of shared process context information. The present invention may be implemented by an operating system using current thread models (including out-of-sequence operation), making it easier to incorporate into existing networks. The DPC is much smaller than a typical Shared Virtual Memory system and thus will be faster. In addition, it is more secure than a global share memory because access is allowed only to other threads in the same distributed process. Similarly, integrity is maintained because the processes are not allowed to write into other processes contexts.

While the present invention may be implemented using different process management techniques, in the preferred embodiment the distributed process is managed using a universally unique identification number (UUID) which is assigned when the distributed process is created. Each distributed thread that is created under the distributed process knows the UUID of the distributed process to which it belongs. During construction of the distributed process, the distributed process context (DPC) is created. The UUID of the distributed process is also used to access the DPC. An interface on the DPC allows those threads with proper access rights to read and write data to and from the DPC.

The shared memory DPC could also be implemented via any number of shared memory protocols. In the preferred implementation, a hierarchical global name server is used as the distribution and update mechanism. Each DPC has a separate named context (i.e., level) in the name space. A DPC is accessed by first gaining access to the correct named context. Reading a field in the DPC results in its value being fetched from the named context and cached on the local machine in order to improve subsequent reads of the field. Updating a field in the DPC simply updates the corresponding value in the named context. A write-invalidate caching policy is used to keep the shared DPC in sync; however other policies, such as write-update, could also be used. On initial access to the DPC, frequently accessed fields can be loaded line-fashion into the local cache to improve priming performance.

Figure 4:
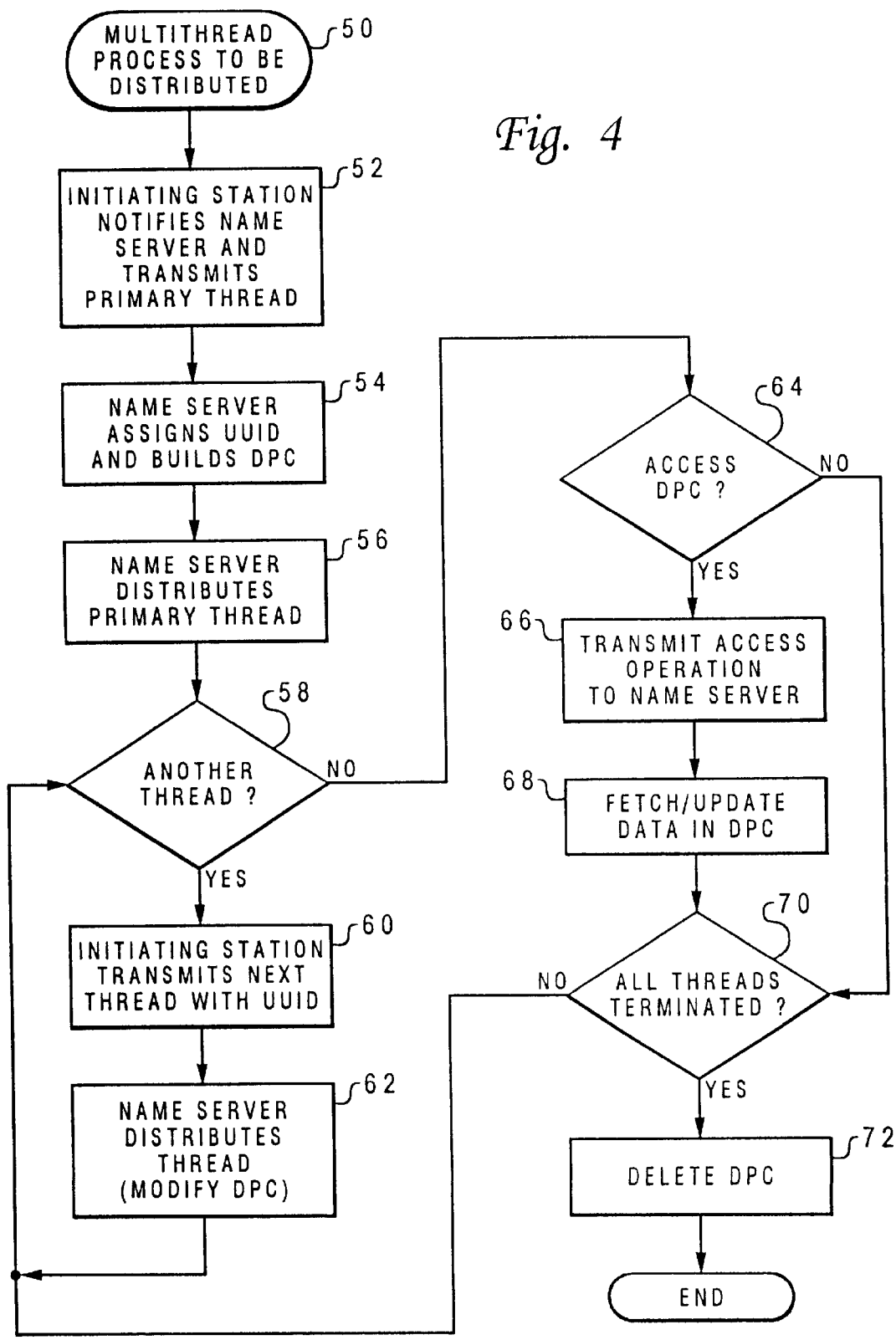
FIG. 4 is chart depicting the logic flow in the creation and maintenance of a distributed process according to the present invention.

The preferred embodiment may be further understood with reference to the flowchart of FIG. 4. First, an operating system running on one of the data processing stations determines that a multithread process is to be distributed (50). The criteria for making this determination may vary considerably, but could be as simple as checking the process against a threshold number of threads. In any case, it is not necessary that all multithread processes be distributed. The process may be initiated by any station (e.g., client or server). To create the distributed process, the initiating station transmits a notification to the global name server with the primary thread (52). The name server assigns the UUID and transmits it with a response to the initiating station, and begins to build the distributed process context by allocating physical memory from one or more of the stations (54). The name server then distributes the first thread to one of the stations (56), along with the UUID; in an alternative implementation, the initiating station could be responsible for distribution of threads, i.e., transmitting threads directly to other data processing stations instead of indirectly through the global name server. The selection of the station may be made according to various schemes, such as by selecting a station which has least recently been assigned a thread, from this or any other distributed process (the global name server can maintain a record of thread assignments). Each subsequent thread (58) created in the process is transmitted to the name server with the UUID (60), and those threads are likewise distributed (62). If necessary, the DPC can be modified, by adding more physical memory from a new station or a station already having a portion of its memory dedicated to the DPC, or otherwise rebuilt.

Whenever the execution of any distributed thread results in accessing the DPC via a read or write operation (64), the operation is transmitted to the name server with the UUID of the distributed process (66). The name server can maintain a table or index of stations and associated UUIDs to confirm that a particular station is authorized to access a particular DPC, and then carry out the operation (68). For a read operation, the name server can fetch the value and provide it to the requesting station, or instruct the machine containing the physical memory corresponding to the accessed portion of the DPC to transmit the value directly to the requesting station. For a write operation, the new value is transmitted from the name server to the appropriate station to update the DPC, and a broadcast is issued to all stations which might have a stale copy of the value in cache, to invalidate the copy.

When a distributed thread terminates, it notifies the name server. Any index of stations with associated UUIDs is updated. After all threads have terminated (70), i.e., the process has ended, the DPC can be deleted (72), allowing the stations to deallocate the corresponding physical memory. The previously used UUID also becomes available for later use.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, although FIG. 2 illustrates a client-server network, the invention can also be used wherein a plurality of workstations are interconnected without using any type of server. It is therefore contemplated that such modifications can be made without departing from the spirit or scope of the present invention as defined in the appended claims.

We claim:

1. A computer network comprising:

a communications medium;

a plurality of data processing stations each having one or more processors, a communication device connected to said communications medium, and a system memory device; and means for distributing a plurality of threads associated with a process initiated by one of said data processing stations among at least two of said data processing stations, said distributing means including a global name server for distributing said threads among said data processing stations, for updating values associated with said threads, and for assigning a unique identification number to said process, wherein subsequent threads in the process are managed by the global name server using the unique identification number.

2. The computer network of claim 1 wherein said distributing means includes means for establishing a distributed process context associated with said threads.

3. The computer network of claim 2 wherein each data processing station which executes one of said threads has a dedicated portion of its memory device forming part of the distributed process context.

4. The computer network of claim 2 wherein said distributing means includes interface means allowing said at least two data processing stations executing said threads to read and write data to and from said distributed process context.

5. The computer network of claim 4 wherein said distributing means further includes means for loading data from said distributed process context line-fashion into a local cache of a requesting one of said data processing stations when said requesting data processing station initially executes a read operation.

6. The computer network of claim 4 wherein said distributing means further includes means for confirming that a particular one of said data processing stations is authorized to access said distributed process context.

7. The computer network of claim 4 wherein said distributing means further includes means for establishing a write-invaidate caching policy for said distributed process context.

8. The computer network of claim 2 wherein said distributing means creates said distributed process context by dividing logical addresses used by said process among physical addresses corresponding to respective portions of said system memory devices in different data processing stations.

9. The computer network of claim 1 wherein said distributing means further distributes other threads from other processes among said data processing stations.

10. A computer network comprising:

a communications medium; and a plurality of data processing stations each having one or more processors, a communication device connected to said communications medium, and a system memory device, one of said data processing stations being a global name server having means for distributing a plurality of threads associated with a process initiated by one of said data processing stations among said data processing stations, establishing a distributed process context associated with said threads, updating values in said distributed process context, and assigning a unique identification number to said process such that said threads are distributed with said unique identification number, and said data processing stations executing said threads transmit associated access operations to said global name server with said unique identification number.

11. The computer network of claim 10 wherein said global name server confirms that any of said data processing stations transmitting one of said access operations is authorized to access said distributed process context.

12. A method of processing a computer program on a network having a plurality of data processing stations, one of the data processing stations being a global name server, comprising the steps of:

initiating a multithread process at a first data processing station, including the step of transmitting a notification from the first data processing station to the global name server;

creating a unique identifier for the multithread process, including the step of the global name server assigning a unique identification number to the process;

transmitting at least one thread to a second data processing station;

executing the at least one thread at the second data processing station; and managing subsequent threads in the multithread process with the global name server using the unique identification number.

13. The method of claim 12 further comprising the step of establishing a distributed process context associated with the process.

14. The method of claim 13 wherein:

one of the data processing stations is a global name server;

said initiating step includes the step of transmitting a notification from the first data processing station to the global name server;

said creating step includes the step of the global name server assigning a unique identification number to the process; and said establishing step includes the step of building the distributed process context by allocating physical memory from one or more of the data processing stations.

15. The method of claim 14 further comprising the steps of:

the second data processing station issuing an access operation to the global name server as a result of said executing step; and the global name server carrying out the access operation on the distributed process context.

16. The computer network of claim 13 further comprising the step confirming that a particular one of the data processing stations is authorized to access the distributed process context.

17. The method of claim 12 wherein:

the global name server maintains a record of thread assignments to different data processing stations; and said transmitting step includes the step of selecting a data processing station which has least recently been assigned a thread.

* * * * *